UNITED STATES PATENT OFFICE.

NOAH WRINKLE AND WALTER A. KUHNERT, OF SAN FRANCISCO, CALIFORNIA.

METHOD OF SEPARATELY OBTAINING POTASSIUM CHLORID AND BORAX FROM CERTAIN DRY SALTS.

1,316,755.

Specification of Letters Patent. Patented Sept. 23, 1919.

No Drawing. Application filed May 22, 1919. Serial No. 299,042.

*To all whom it may concern:*

Be it known that we, NOAH WRINKLE and WALTER A. KUHNERT, citizens of the United States, and residents of San Francisco, in the county of San Francisco and State of California, have invented new and useful Improvements in Methods of Separately Obtaining Potassium Chlorid and Borax from Certain Dry Salts, of which the following is a specification.

The present invention relates to improvements in methods of obtaining potassium chlorid and borax from certain mixtures of dry salts which contain potassium chlorid, borax, and other salts.

In treating crude, or mixed salts consisting of potassium chlorid, sodium bi-borate and other salts, we add to the mixture of salts a solution of sodium hydrate for the purpose of converting the sodium bi-borate into sodium meta-borate soluble in the solution. The sodium meta-borate and excess of sodium hydrate solution is removed from the crystals by centrifuging or filtration and the crystals are then washed free of adhering borate and sodium hydrate solution with fresh water. This treatment effects removal of all the sodium bi-borate from the potassium chlorid crystals remaining insoluble after removal therefrom of the borate and sodium hydrate solution.

The mother liquor is then treated with carbon dioxid, obtained from a lime kiln, or other suitable source. This treatment results in the conversion of the sodium meta-borate to sodium bi-borate, insoluble in the solution, in accordance with the following formula:—

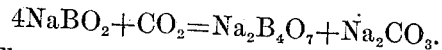

$$4NaBO_2 + CO_2 = Na_2B_4O_7 + Na_2CO_3.$$

The mother liquor is then removed from the borax.

We claim:—

In a process of obtaining potassium chlorid and borax from mixed dry salts comprising potassium chlorid and borax, treating said salts with a solution of sodium hydrate to convert the borax to sodium meta-borate soluble in the solution, removing the insoluble crystals from the solution, and treating the solution with carbon dioxid to convert the sodium meta-borate to sodium bi-borate insoluble in the mother liquor and removing the mother liquor from the sodium bi-borate.

NOAH WRINKLE.
WALTER A. KUHNERT.